(12) United States Patent
Yamamoto

(10) Patent No.: US 6,483,829 B1
(45) Date of Patent: Nov. 19, 2002

(54) PILOT SIGNAL DETECTION AND RADIO COMMUNICATION TERMINAL APPARATUS

(75) Inventor: Katsuya Yamamoto, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/447,265

(22) Filed: Nov. 23, 1999

(30) Foreign Application Priority Data

Nov. 30, 1998 (JP) ............................................. 10-339102

(51) Int. Cl.⁷ ................................................ H04B 7/216
(52) U.S. Cl. ........................ 370/342; 370/515; 375/145; 375/149
(58) Field of Search ................................. 370/342, 515; 375/144, 145, 149, 148, 326, 340, 367, 130; 455/502

(56) References Cited

U.S. PATENT DOCUMENTS 5,627,835 A * 5/1997 Witter ........................ 370/320
6,122,334 A * 9/2000 Hughes ....................... 375/340
6,212,398 B1 * 4/2001 Roberts et al. ............. 455/502
6,263,010 B1 * 7/2001 Naruse et al. .............. 375/130

* cited by examiner

Primary Examiner—Doris H. To
(74) Attorney, Agent, or Firm—Jay H. Maioli

(57) ABSTRACT

In a mobile station terminal apparatus during connection of a call, the received energies of pilot signals transmitted from neighbor base stations in a CDMA system are monitored. Upon disconnection of the call, a process of pilot signal detection is executed repeatedly and preferentially in order from an Active Set of pilot signals having great received energies, on the basis of the result of monitoring the received energies of the pilot signals during connection of the call, whereby the mobile communication terminal apparatus is enabled quickly and efficiently to receive signals from the base stations in the same CDMA system and can be quickly placed again in the waiting state ready to accept a mobile communication service.

6 Claims, 3 Drawing Sheets

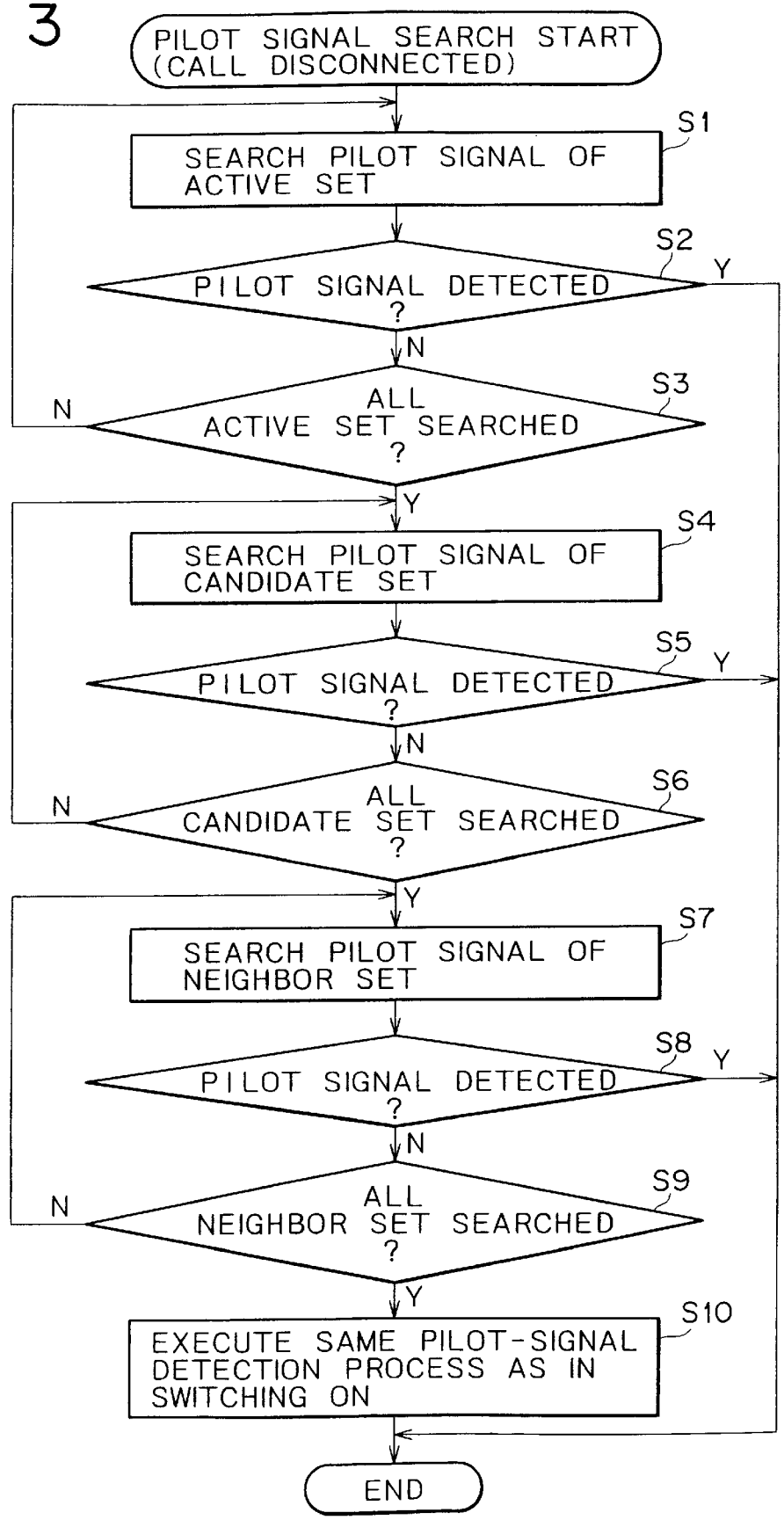

PILOT SIGNAL DETECTION AND RADIO COMMUNICATION TERMINAL APPARATUS

BACKGROUND OF THE INVENTION

The present invention relates to a method for detection of a pilot signal provided from a base station in a mobile communication system employing CDMA (Code Division Multiple Access) for example and required for demodulating a signal from the base station, and also relates to a radio communication terminal apparatus adopting such a detection method.

In communications where a multiplicity of mobile stations share a single base station in common, it is generally customary to employ a technique of frequency division multiple access, time division multiple access or code division multiple access in order to avoid interference between the communication channels of the mobile stations. Each of such techniques has individual characteristics respectively, and an appropriate one is selectively employed in compliance with the purpose of the communication system.

For example, in code division multiple access (hereinafter referred to as CDMA), a specific code assigned to each channel, e.g., PN (pseudo-random noise sequence) code, is used for spreading modulated waves of one carrier frequency to another band wider than the original frequency band (hereinafter referred to as spread spectrum), and the modulated waves processed by such spread spectrum are multiplexed and transmitted. And the received spread spectrum signal is synchronized with the PN code supplied via a subject demodulation channel, whereby only the desired channel alone is identified.

More specifically, first on the transmission side, different PN codes are assigned to the channels individually. In this case, the PN codes are composed of pseudo-random noise sequences. On the transmission side, modulated waves to be transmitted via the relevant channels are multiplied by mutually different PN codes to be thereby processed through spread spectrum. In this stage, the modulated waves to be transmitted have already been processed through predetermined modulation prior to such spread spectrum. The modulated waves thus processed by spread spectrum are then multiplexed and transmitted.

Subsequently on the reception side, the received signal sent from the transmission side is processed through inverse spread spectrum by synchronous multiplication of the same PN code as that assigned to the subject demodulation channel, so that only the modulated waves transmitted via the desired channel alone can be demodulated.

According to such CDMA, communication can be performed directly per call only if the mutually identical code is preset on both the transmission and reception sides. In the CDMA where a process of spread spectrum is executed for modulated waves by the use of different PN codes with regard to the respective channels, the reception side is capable of demodulating only the spread spectrum signal transmitted thereto via the subject demodulation channel, and superior maintenance of privacy can be achieved since the PN codes are composed of pseudo-random noise sequences.

Also in the mobile communication system employing such CDMA, each base station on the transmission side sends PN codes repeatedly as pilot signals for attaining synchronism in the mobile stations, keeping the synchronism and further for reproducing clock pulses. And in each mobile station on the reception side, the pilot signals sent from a plurality of base stations are detected, and the timings of detection are allocated to the individual demodulators respectively. Each mobile station generates a PN code in its demodulator. The demodulator then demodulates the spread spectrum signal, which is transmitted from the desired base station, through multiplication by the generated PN code at the allocated timing.

Thus, in the CDMA mobile communication system, the base stations send PN codes of mutually different timings as pilot signals. Each mobile station detects the timing of the pilot signal supplied from the desired base station, then synchronizes the PN code, which is generated in its demodulator, with the detected timing, and executes inverse spread spectrum by the use of the PN code as mentioned, thereby properly demodulating only the spread spectrum signal transmitted from the desired base station.

Although the base stations transmit PN codes of mutually different timings as described, the PN codes themselves are in the same code pattern. That is, the timing difference between the different pilot signals of the individual base stations corresponds directly to the difference between the PN codes of the base stations.

In the mobile communication system, any mobile station such as a radio communication terminal is normally placed in a service waiting state after being switched on and synchronized with the system. In this case, a mobile communication service denotes a call or the like rendered by telephone service. The mobile station settles a call to receive a mobile communication service and, after completion of the service, disconnects the call to be thereby placed in a service waiting state again.

After such disconnection of the call, it is desired that the mobile station be reset immediately to a state ready for receiving a mobile communication service again. For example, according to the CDMA standardized as IS-95 in U.S.A., it is prescribed to receive the same CDMA system after the mobile station disconnects a call. More concretely, it is prescribed to receive a pilot signal of the same frequency provided by the same CDMA system managerial proprietor.

As for a method of detecting a pilot signal after disconnection of a call, it may be considered to employ the same pilot signal detection method as that used when switching on the mobile station. In this case, for detection of the pilot signal, an integration of 128 chips is executed, and one period (32,768 chips) of a PN code is detected. Supposing now that one chip corresponds approximately to $0.8\ \mu$second as prescribed in the IS-95, then the time required for detecting the pilot signal is $$128\ \text{chips} \times 32{,}768\ \text{chips} = 4{,}194{,}304\ \text{chips} = \text{Approx. 3.4 seconds} \quad (1)$$

Thus, due to such detection of the pilot signal from the base station after disconnection of each call in the same manner as in switching on, the mobile station fails to be placed immediately in a waiting state and needs a lapse of approximately 3.4 seconds after disconnection of each call, so that no service is receivable during that time. For this reason, there is demanded an improved pilot signal detection method which enables any mobile station to receive a pilot signal fast and efficiently from the base station in the same CDMA system and further enables the mobile station to be reset quickly to a state ready for receiving a mobile communication service.

SUMMARY OF THE INVENTION

It is therefore an object of the present invention to provide a pilot signal detection method which enables a mobile station to receive a signal fast with high efficiency in the same CDMA system after disconnection of each call and is capable of resetting the mobile station to a waiting state ready for accepting the provision of a mobile communication service.

And another object of the present invention resides in providing a radio communication terminal apparatus adopting such a pilot signal detection method.

According to one aspect of the present invention, there is provided a pilot signal detection method carried out in a CDMA radio communication terminal apparatus. The detection method comprises the steps of detecting, during connection of a channel, the received energies of a plurality of pilot signals transmitted from a plurality of base stations, then monitoring and storing the detected energies of the plural pilot signals and, when connecting the channel again after disconnection thereof, detecting the timings of the pilot signals preferentially in order from the pilot signal of the greatest received energy on the basis of the result of monitoring the stored energies of the plural pilot signals.

According to another aspect of the present invention, there is provided a CDMA radio communication terminal apparatus which comprises a detection means for detecting, during connection of a channel, the received energies of a plurality of pilot signals transmitted from a plurality of base stations; a monitor means for monitoring and storing the detected energies of the plural pilot signals; and a control means for controlling the detection means in such a manner that, when connecting the channel again after disconnection thereof, the timings of the pilot signals are detected preferentially in order from the pilot signal of the greatest received energy on the basis of the result of monitoring the stored energies of the plural pilot signals.

Thus, in detecting a new pilot signal after disconnection of each call, the base-station pilot signal of the greatest received energy can be preferentially searched on the basis of the result of monitoring the received energies of the pilot signals from the base stations prior to disconnection of the call, hence realizing fast and efficient re-acquisition of the pilot signal after disconnection of the call.

The above and other features and advantages of the present invention will become apparent from the following description which will be given with reference to the illustrative accompanying drawings.

BRIEF DESCRIPTION OF THE DRAWINGS

FIG. 3 is a flowchart for explaining a processing routine executed to detect pilot signals in the mobile station terminal apparatus shown in FIG. 1.

DETAILED DESCRIPTION OF THE PREFERRED EMBODIMENTS

Hereinafter an explanation will be given with reference to the accompanying drawings on the pilot signal detection method of the present invention and also on a preferred embodiment representing a radio communication terminal apparatus where such a detection method is applied. The embodiment described below relates to an exemplary case where the pilot signal detection method and the radio communication terminal apparatus of the present invention are applied to a CDMA communication system standardized as IS-95 in U.S.A. and so forth.

Figure 1:
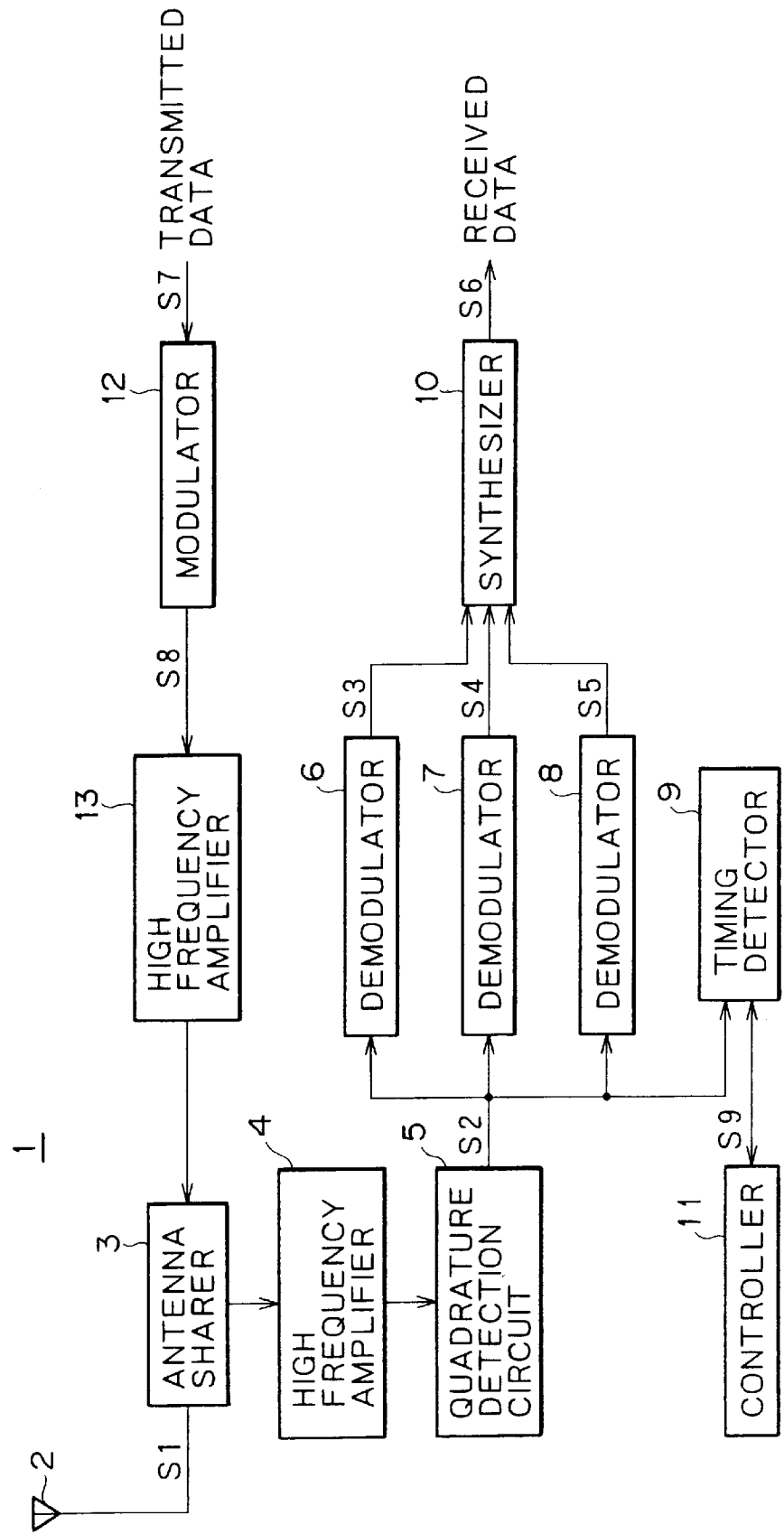
FIG. 1 is a block diagram for explaining a preferred embodiment representative of the radio communication terminal apparatus of the present invention.

FIG. 1 is a block diagram for explaining a preferred embodiment representative of the radio communication terminal apparatus of the present invention. The radio communication terminal apparatus in this embodiment consists of a portable telephone, a car telephone or the like usable while in motion outdoors. In the following description, this apparatus will be referred to as a mobile station terminal apparatus.

As shown in FIG. 1, the mobile station terminal apparatus 1 in this embodiment comprises an antenna 2, an antenna sharer 3, a high frequency amplifier 4, a quadrature detection circuit 5, demodulators 6, 7 and 8, a timing detector 9, a signal synthesizer 10, a controller 11, a modulator 12 and a high frequency amplifier 13. The mobile station terminal apparatus 1 is a rake receiver having three demodulators 6, 7 and 8.

The mobile station terminal apparatus 1 receives input signals transmitted from a plurality of base stations by CDMA, and then demodulates the received signals by the use of timings of pilot signals included in the received signals. More specifically, the mobile station terminal apparatus 1 is capable of demodulating only the desired signal received from a subject base station for demodulation.

The controller 11 consists of a microcomputer equipped with CPU, ROM, RAM and so forth. As will be described in detail later, this controller 11 manages and controls the state of each component device in the mobile station terminal apparatus 1, and also manages and stores the reception states of signals from a plurality of base stations.

In the mobile station terminal apparatus 1, the input signal S1 received by the antenna 2 is converted into a base-band signal S2 while being processed successively via the antenna sharer 3, the high frequency amplifier 4 and the quadrature detection circuit 5. Subsequently, the base-band signal S2 thus obtained is converted by an unshown A/D converter into a digital signal, which is then supplied to the demodulators 6, 7, 8 and the timing detector 9.

The timing detector 9 detects, out of the base-band signal S2, pilot signals transmitted from the base stations. The timings of the pilot signals detected by the timing detector 9 are sent to the controller 11. Then the controller 11 allocates the timings of the pilot signals to the demodulators 6, 7 and 8 respectively by a control signal S9.

Each of the demodulators 6, 7 and 8 generates a PN code at the timing allocated thereto, then executes a process of inverse spread spectrum to demodulate the base-band signal S2, and supplies demodulated signals S3, S4 and S5 to the signal synthesizer 10.

More specifically, each of the demodulators 6, 7 and 8 has a PN code generator which generates a PN code individually. The base-band signal S2 is demodulated through multiplication of the PN code at the allocated timing mentioned above. Each of the base stations transmits the timing of the PN code at the timing unique to the individual base station. Consequently, only the signal transmitted from the subject base station can be selectively demodulated by first synchronizing the PN code with the timing indicated by the pilot signal and then demodulating the base-band signal S2 by the use of such synchronized PN code.

The synthesizer 10 receives the demodulated signals S3, S4 and S5 supplied from a multi-path via a plurality of transmission lines and then synthesizes the received signals. Since the signals S3, S4 and S5 are demodulated at mutually different timings, the synthesizer 10 synchronizes the timings of the demodulated signals S3, S4 and S5 before synthesizing the same.

Thus, the synthesizer 10 can generate received data S6 having high anti-noise and anti-disturbance ratios, by synthesizing the demodulated signals S3, S4 and S5 as mentioned above. The received data S6 thus obtained is supplied via an amplifier circuit to a speaker (receiver) so that the voice from the opposite station is emitted.

The method of obtaining such high-quality received data S6 stably by synthesizing the plural demodulated signals S3, S4 and S5 is termed "rake reception".

The mobile station terminal apparatus 1 has a transmitting circuit also. For example, transmission data S7 of voice or the like picked up by a microphone (transmitter) is supplied to the modulator 12, where the transmission data S7 is processed through spread spectrum modulation and offset QPSK (quadrature phase shift keying) modulation. The modulated signal S8 thus produced in the modulator 12 is amplified by the high frequency amplifier 13 and then is radiated and transmitted via the antenna sharer 3 and the antenna 2.

The timing detector 9 is controlled by a control signal S9, which is supplied from the controller 11, with regard to its search range (search window) of the pilot signal timing and the precision of detection. The timing detector 9 detects a new path continuously in cooperation with the controller 11 and performs allocation thereof in case any demodulator is in an unused state.

Each mobile station terminal apparatus 1 in the IS-95 mobile communication system is obliged to manage, during a call, the received energies and the timings (phases of PN codes) of the pilot signals from the neighbor base stations per predetermined sets.

More specifically, as viewed from each mobile station terminal apparatus 1, pilot signals transmitted from neighbor base stations are classified into four sets of (1) Active Set, (2) Candidate Set, (3) Neighbor Set and (4) Remaining Set, as will be described later. And with respect to the individual sets, each mobile station terminal apparatus 1 monitors the pilot signals received from the base stations, and manages the received energies and the timings of the pilot signals from the base stations.

The received energies and the timings of the pilot signals from the base stations are detected by the timing detector 9 for example, and the results of such detection are monitored and managed by the controller 11. That is, in this embodiment, the neighbor base station information composed of the result of monitoring the pilot signals and so forth is managed by the controller 11.

Noting that each mobile station terminal apparatus 1 thus manages sets of pilot signals from the neighbor base stations during a call, the mobile station terminal apparatus 1 in this embodiment is so contrived as to detect, after disconnection of the call, the pilot signals preferentially in order from the set considered to be in the best communication state, hence realizing a fast transition to a waiting state.

In this embodiment, such detection of pilot signals is executed by the timing detector 9 in cooperation with the controller 11. That is, the timing detector 9 has the function of a detection means for detecting the received energies of the pilot signals.

The controller 11 has the function of a monitor means for monitoring the received energies and the timings of the pilot signals. And the timing detector 9 cooperating with the controller 11 has the function of a pilot signal detection means.

For the purpose of facilitating a description on the pilot signal detection method carried out in the mobile station terminal apparatus 1, an explanation will now be given below, with reference to FIG. 2, in regard to the summary of pilot signal monitoring during a call (during connection) of the mobile station terminal apparatus 1 in the IS-95 mobile communication system. The pilot signal monitoring mentioned below is executed also in the mobile station terminal apparatus 1 in this embodiment.

Figure 2:
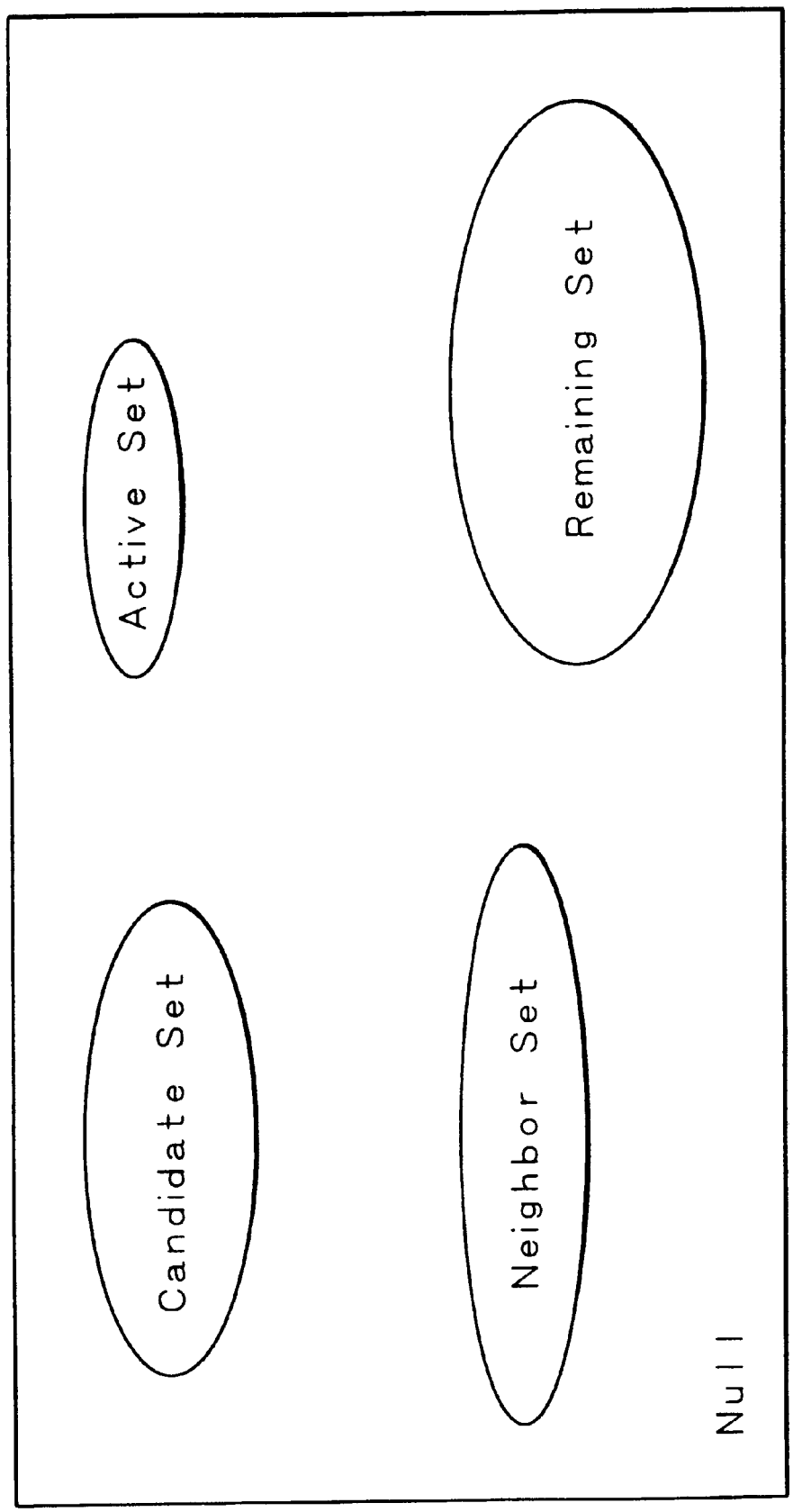
FIG. 2 is a schematic diagram for explaining how to monitor pilot signals during a call in IS-95.

As mentioned, the mobile station terminal apparatus 1 of the IS-95 mobile communication system in this embodiment monitors pilot signals from neighbor base stations per predetermined four sets, as shown in FIG. 2.

In FIG. 2, an Active Set is a group of pilot signals from base stations with which the mobile station terminal apparatus 1 in the IS-95 system is actually in communication, and a maximum of six active-set pilot signals can be existent. That is, the mobile station terminal apparatus 1 is capable of maintaining communications with a maximum of six base stations simultaneously.

A Candidate Set in the IS-95 system is a group of pilot signals whose received energies substantially equal to those of active-set pilot signals are detected in the mobile station terminal apparatus, and a maximum of five candidate-set pilot signals can be existent. The mobile station terminal apparatus 1 reports the candidate-set pilot signals to the base stations of the Active Set currently in communication, so as to be always ready for hand-off (to maintain communication by switching the base stations).

A Neighbor Set in the IS-95 system is a list of neighbor base stations indicated by the base stations of the Active Set being currently in communication, and a maximum of twenty neighbor base stations can be existent.

A Remaining Set in the IS-95 system is a group of pilot signals other than those of the above-described Active Set, Candidate Set and Neighbor Set.

According to the IS-95 system, it is possible to manage a total of 512 base stations of one frequency by shifting the timings (phases of PN codes) of pilot signals. Since at least one Active Set is existent, a maximum of 511 Remaining Sets can be managed.

In mobile communication where the mobile station terminal apparatus 1 is in motion at a normal speed, the mobile station terminal apparatus 1 stays, in most cases, within the cover area of the base station with which the terminal apparatus 1 has been in communication until disconnection of the preceding call, whereby it is supposed that the neighbor base station information managed per four sets is not varied much in the mobile station terminal apparatus 1 as mentioned.

Therefore, the mobile station terminal apparatus 1 of this embodiment utilizes the neighbor base station information (base station monitor information) prior to each call disconnection per four sets as shown in FIG. 2, and executes fast pilot signal re-acquisition efficiently after each call disconnection to be thereby placed in a waiting state quickly.

Referring now to a flowchart of FIG. 3, an explanation will be given on the pilot signal detection method carried out in the mobile station terminal apparatus 1 of this embodiment. Upon generation of a call disconnection in the mobile station terminal apparatus 1, the controller 11 starts the processing routine shown in FIG. 3.

First, the controller 11 controls the timing detector 9 to execute a process of pilot signal detection (step S1) in the vicinity of the phase of the PN code received from the base station as a pilot signal belonging to the Active Set prior to the call disconnection. A pilot search window for neighbor search normally requires 40 chips or so, although different depending on the delay environment of pilot signals. When converted into a time, 40 chips correspond to, as mentioned already, 40 chips×0.8 µsec=32 µsec, which is approximately equal to 10 km in view of the path difference in radio waves.

Practically, it is almost improbable that radio waves arrive with a delay of 10 km in the path. In executing a process of pilot signal detection with regard to one pilot signal belonging to an Active Set by such a 40-chip search window, the required detection time based on the same 128-chip integration as in the aforementioned switching on is calculated as follows:

$$128 \text{ chips} \times 40 \text{ chips} = 5{,}120 \text{ chips} = \text{Approx. 4 msec}$$

Subsequently a decision is made (step S2) as to whether the pilot signal has been detected or not. And if the result of this decision is affirmative to signify a detection, the process shown in FIG. 3 is terminated. Meanwhile, if the result of the decision at step S2 is negative to signify no detection of the pilot signal, another decision is made (step S3) as to whether the process of pilot signal detection has been executed with regard to the entire pilot signals belonging to the Active Set.

And if the result of the decision at step S3 is negative to signify that the process of pilot signal detection has not yet been executed completely with regard to the entire pilot signals belonging to the Active Set, the processes from step S1 are executed repeatedly to detect the next pilot signal belonging to the Active Set.

In case a maximum of six pilot signals belonging to the Active Set are existent, the time required for detecting them is calculated as $$4 \text{ msec} \times 6 = \text{Approx. 24 msec} \qquad (2)$$

And thus, the process of pilot signal detection is terminated with regard to the entire pilot signals belonging to the Active Set.

Meanwhile, if the result of the decision at step S3 is affirmative to signify that the process of pilot signal detection has been executed completely with regard to the entire pilot signals belonging to the Active Set, i.e., no pilot signal has been detected in the Active Set, then the process of pilot signal detection is executed with regard to the pilot signal belonging to the Candidate Set.

More specifically, the controller 11 controls the timing detector 9 to execute a process of pilot signal detection (step S4) in the vicinity of the phase of the PN code received from the base station as a pilot signal belonging to the Candidate Set prior to the call disconnection.

Subsequently a decision is made (step S5) as to whether any pilot signal has been detected or not. And if the result of this decision is affirmative to signify a detection, the process shown in FIG. 3 is terminated. Meanwhile, if the result of the decision at step S5 is negative to signify no detection of any pilot signal, another decision is made (step S6) as to whether the process of pilot signal detection has been executed or not with regard to the entire pilot signals belonging to the Candidate Set.

In case the result of the decision at step S6 is negative to signify that the process of pilot signal detection has not yet been executed completely with regard to the entire pilot signals belonging to the Candidate Set, then the processes from step S4 are executed repeatedly to detect the next pilot signal belonging to the Candidate Set.

Depending on the call condition, there may be a case where none of candidate-set pilot signal is existent. When a maximum of five candidate-set pilot signals are existent for example, the time required for detection of the pilot signals is approximately 20 msec as follows:

$$4 \text{ msec} \times 5 = \text{Approx. 20 msec} \qquad (3)$$

If no pilot signal has been detected in the Candidate Set, a process of pilot signal detection is executed with regard to the Neighbor Set, as in the foregoing case of the Active Set and the Candidate Set.

More specifically, the controller 11 controls the timing detector 9 to execute the process of pilot signal detection (step S7) in the vicinity of the phase of the PN code received from the base station as a pilot signal belonging to the Neighbor Set prior to the call disconnection.

Subsequently a decision is made (step S8) as to whether any pilot signal has been detected or not. And if the result of this decision is affirmative to signify a detection, the process shown in FIG. 3 is terminated. Meanwhile, if the result of the decision at step S8 is negative to signify no detection of any pilot signal, another decision is made (step S9) as to whether the process of pilot signal detection has been executed or not with regard to the entire pilot signals belonging to the Neighbor Set.

In case the result of the decision at step S9 is negative to signify that the process of pilot signal detection has not yet been executed completely with regard to the entire pilot signals belonging to the Neighbor Set, then the processes from step S7 are executed repeatedly to detect the next pilot signal belonging to the Neighbor Set.

Depending on the call condition, there may be a case where none of neighbor-set pilot signal is existent. When a maximum of twenty neighbor-set pilot signals are existent for example, the time required for detection of the pilot signals is approximately 80 msec as follows:

$$4 \text{ msec} \times 20 = \text{Approx. 80 msec} \qquad (4)$$

If no pilot signal has been detected in the Neighbor Set, a process of pilot signal detection is executed (step S10) with regard to one period (32,768 chips) of the entire PN codes, as in the aforementioned switching on.

Thus, in the mobile station terminal apparatus 1 of this embodiment, the neighbor base station information is managed, during each call, by the mobile station terminal apparatus 1 per four pilot signal groups of (1) Active Set, (2) Candidate Set, (3) Neighbor Set and (4) Remaining Set, and the processing routine of pilot signal detection after disconnection of each call is executed per set on the basis of such neighbor base station information.

That is, the base-station pilot signal of the greatest received energy is searched preferentially in accordance with the result of monitoring the received energies of the pilot signals from the base stations prior to disconnection of each call, thereby realizing fast and efficient detection (reacquisition) of the pilot signal after the call disconnection.

When pilot signals have been detected, after the call disconnection, by the processing routine for the Active Set prior to the call disconnection, the required time is improved as Eq. (1)/Eq. (2)=3.4 sec/24 msec=approx. 142 in comparison with the exemplary related art where the present invention is not applied for detecting the pilot signals in switching on. Thus, it becomes possible in the embodiment to raise the pilot signal detection speed approximately 142 times.

When pilot signals have been detected by the processing routine for the Candidate Set, the required time is improved as Eq. (1)/(Eq. (2)+Eq. (3))=3.4 sec/(24 msec+20 msec)= approx. 77, so that it becomes possible in the embodiment to raise the pilot signal detection speed approximately 77 times.

Further when pilot signals have been detected by the processing routine for the Neighbor Set, the required time is improved as Eq. (1)/(Eq. (2)+Eq. (3)+Eq. (4))=3.4 sec/(24 msec+20 msec+80 msec))=approx. 27, so that it becomes possible in the embodiment to raise the pilot signal detection speed approximately 27 times.

And in case no pilot signal has been detected even by the processing routine for the Neighbor Set, there is executed, in the manner mentioned, the same pilot signal detection process as that in switching on the mobile station terminal apparatus 1. In this case also, the additional required time is merely 124 msec=(24 msec+20 msec+80 msec) or so after the call disconnection.

More specifically, in the processing routine executed for detection of pilot signals belonging to the three groups of active, candidate and Neighbor Sets, the required time is obviously shorter than 3.4 seconds needed for detection of pilot signals in switching on the mobile station terminal apparatus 1. Therefore, even in case no pilot signal has been detected by the processing routine relative to the three groups of active, candidate and Neighbor Sets, merely an additional time of 124 msec is required to execute the processing routine for detection of pilot signals, and the time overhead thereof causes nearly none of harmful influence.

In the embodiment mentioned above, a detection process is executed per previously grouped set of pilot signals. However, the present invention is not limited to such embodiment alone. For example, the mobile station terminal apparatus may be so contrived as to manage pilot signals of great received energies, wherein the pilot signals after disconnection of each call can be detected in order successively from the pilot signal of the greatest received energy.

What is claimed is:

1. A pilot signal detection method carried out in a CDMA radio communication terminal apparatus, comprising the steps of:

detecting, during connection of a channel, received energies of a plurality of pilot signals transmitted from a plurality of base stations;

monitoring and storing the received energies of said plurality of pilot signals detected in the step of detecting; and when connecting the channel again after a disconnection thereof, detecting timings of the plurality of pilot signals preferentially in order from a pilot signal having a greatest received energy based on a result of the step of monitoring and storing the energies of the plurality pilot signals.

2. The pilot signal detection method according to claim 1, wherein the result of monitoring the received energies includes classifying the plurality of pilot signals into a plurality of groups in accordance with levels of the received energies, and the timings of the pilot signals are detected in the step of detecting preferentially in order from a highest-level group of the received energies.

3. The pilot signal detection method according to claim 2, wherein said plurality of groups include at least two groups selected from three groups consisting of a first group of pilot signals from base stations with which said radio communication terminal apparatus is in communication simultaneously, a second group of pilot signals whose received energies detected by said radio communication terminal apparatus are close to the received energies of the pilot signals belonging to said first group, and a third group of pilot signals transmitted from neighbor base stations reported to said radio communication terminal apparatus from the base stations which transmit the pilot signals belonging to said first group.

4. The radio communication terminal apparatus according to claim 1, wherein said monitor means includes means for classifying into a plurality of groups a result of monitoring the received energies of said plurality of pilot signals in accordance with levels of the received energies, and means for storing classified groups of the pilot signals, and said control means controls said detection means to detect the timings of the pilot signals preferentially in order from a highest-level group of the received energies.

5. The radio communication terminal apparatus according to claim 1, wherein said plurality of groups include at least two groups selected from three groups consisting of a first group of pilot signals from base stations with which said radio communication terminal apparatus is in communication simultaneously, a second group of pilot signals whose received energies detected by said radio communication terminal apparatus are close to the received energies of the pilot signals belonging to said first group, and a third group of pilot signals transmitted from neighbor base stations reported to said radio communication terminal apparatus from the base stations which transmit the pilot signals belonging to said first group.

6. A CDMA radio communication terminal apparatus comprising:

detection means for detecting, during connection of a channel, received energies of a plurality of pilot signals transmitted from a plurality of base stations;

monitor means for monitoring and storing the received energies of the plurality of pilot signals detected by said detection means; and control means for controlling said detection means, when connecting the channel again after a disconnection thereof, in such a manner that timings of the plurality of pilot signals are detected preferentially in order from a pilot signal of a greatest received energy based on a result of monitoring the stored received energies of the plural pilot signals in said monitor means.

* * * * *